United States Patent

Olsta et al.

(10) Patent No.: US 7,854,330 B2
(45) Date of Patent: Dec. 21, 2010

(54) CONTAMINANT-REACTIVE GEOCOMPOSITE MAT AND METHOD OF MANUFACTURE AND USE

(75) Inventors: James T. Olsta, Bartlett, IL (US); Charles J. Hornaday, Arlington Heights, IL (US); Robert J. Trauger, Cary, IL (US); Jerald W. Darlington, Jr., Marengo, IL (US)

(73) Assignee: AMCOL International Corporation, Hoffman Estates, IL (US)

( * ) Notice: Subject to any disclaimer, the term of this patent is extended or adjusted under 35 U.S.C. 154(b) by 0 days.

(21) Appl. No.: 12/431,324

(22) Filed: Apr. 28, 2009

(65) Prior Publication Data

US 2009/0208290 A1 Aug. 20, 2009

Related U.S. Application Data

(63) Continuation of application No. 11/741,376, filed on Apr. 27, 2007, now Pat. No. 7,575,682, which is a continuation-in-part of application No. 11/599,080, filed on Nov. 14, 2006, which is a continuation-in-part of application No. 10/718,128, filed on Nov. 19, 2003, now abandoned.

(51) Int. Cl.
*B01D 39/02* (2006.01)
*B01D 39/06* (2006.01)
*B01D 39/00* (2006.01)

(52) U.S. Cl. ............ 210/502.1; 210/503; 210/505; 156/276; 156/145; 156/62.2; 156/308.8; 156/324; 264/112; 264/71

(58) Field of Classification Search .......... None
See application file for complete search history.

(56) References Cited

U.S. PATENT DOCUMENTS 4,165,281 A 8/1979 Kuriyama et al.

(Continued)

FOREIGN PATENT DOCUMENTS

GB 2337723 A 12/1999

(Continued)

OTHER PUBLICATIONS

D. Instanes, "Pollution Control of a Norwegian Fjord by Use of Geotextiles," Proceedings, The Fifth International Conference on Geotextiles, Geomembranes and Related Products, Singapore, pp. 1053-1056, (1994).

(Continued)

*Primary Examiner*—Krishnan S Menon
(74) *Attorney, Agent, or Firm*—Marshall, Gerstein & Borun LLP (57) ABSTRACT

Reactive geocomposite mats, and their method of manufacture, for treating contaminants in sediment, soil or water that allow the passage of essentially non-contaminated water therethrough. The geocomposite mat includes a pre-formed woven or non-woven geotextile, that is needlepunched to an outer geotextile sheet layer to provide a high loft, structurally secured, pre-formed geotextile having a thickness of about 6 mm to about 200 mm, and having, a porosity sufficient to receive a powdered or granular contaminant-reactive material, contaminant-sorptive material, or a contaminant-neutralizing material (hereinafter collectively referred to as "contaminant-reactant material" or "contaminant-reactive material") throughout its thickness, or in any portion of the thickness across its entire major surface(s). The powdered or granular contaminant-reactive material is disposed within the pores of the previously formed, high loft geotextile mat to surround the fibers, e.g., by vacuum or vibrating the high loft mat while in contact with the contaminant-reactive material to allow the powdered or granular contaminant-reactive material to flow by gravity into the pores of the previously formed, needlepunched geotextile. A liquid-permeable outer geotextile sheet then is secured to the filled geotextile, preferably by heating upwardly extending fibers of the pre-formed geotextile mat to prevent the powdered or granular material from escaping from the geotextile during transportation and installation.

11 Claims, 4 Drawing Sheets

U.S. PATENT DOCUMENTS

| | | | |
|---|---|---|---|
| 4,250,172 A | 2/1981 | Mutzenberg et al. | |
| 4,622,260 A | 11/1986 | Tesch | |
| 5,043,076 A | 8/1991 | Alexander | |
| 5,237,945 A | 8/1993 | White | |
| 5,346,565 A | 9/1994 | White | |
| 5,346,566 A | 9/1994 | White | |
| 5,389,166 A | 2/1995 | White | |
| 5,401,552 A * | 3/1995 | Bohrer et al. | 428/87 |
| 5,900,085 A | 5/1999 | Clarey et al. | |
| 6,610,781 B1 | 8/2003 | Zhou et al. | |
| 7,128,498 B2 | 10/2006 | Sheahan et al. | |
| 2002/0151241 A1* | 10/2002 | Sheahan et al. | 442/327 |

FOREIGN PATENT DOCUMENTS

| | | |
|---|---|---|
| JP | 2002018422 | 1/2002 |
| JP | 2002153257 | 5/2002 |
| WO | WO-2005056286 | 6/2005 |

OTHER PUBLICATIONS

Ling et al., "Appendix C: Case Studies on Geotechnical Aspects of In-Situ Sand Capping," Guidance for In-Situ Subaqueous Capping of Contaminated Sediments, pp. C1-C19 (1998).

S. Maynord, "Appendix A: Armor Layer Design," Guidance for In-Situ Subaqueous Capping of Contaminated Sediments, pp. A1-A15 (1998).

International Search Report for PCT/US2006/034951.

* cited by examiner

CONTAMINANT-REACTIVE GEOCOMPOSITE MAT AND METHOD OF MANUFACTURE AND USE

CROSS-REFERENCE TO RELATED APPLICATIONS

This application is a continuation of application Ser. No. 11/741,376 filed Apr. 27, 2007, now U.S. Pat. No. 7,575,682, which is a continuation-in-part of application Ser. No. 11/599,080, filed Nov. 14, 2006, which in turn is a continuation-in-part of application Ser. No. 10/718,128, filed Nov. 19, 2003, now abandoned

FIELD OF THE INVENTION

The present invention is directed to a reactive geocomposite mat for controlling or preventing the further spread of contaminants in soil, sediment or water. More particularly, the geocomposite mat described herein includes a reactive core formed from a high loft geotextile that is filled or partially filled with a powdered or granular reactive material, such as activated carbon, coke breeze, peat moss, polymeric ion exchange resins, polymeric adsorbing resins; zero-valent iron, magnetite, apatite, organophilic clay, zeolite, diatomaceous earth or mixtures thereof and having a liquid-permeable outer geotextile sheet attached to the upper and lower major surfaces of the reactive material-containing geotextile.

BACKGROUND AND PRIOR ART

The prior art is replete with methods and articles used to confine or store a wide variety of environmental contaminants ranging from completely capping, in-situ, contaminated sediments that are left in-place in underwater environments; terrestrial landfills wherein dredged or otherwise collected contaminated sediments are placed within an engineered disposal site surrounded with an impervious liner system and capped with an impervious material; and the use of a reactive mat and/or reactive backfill that surrounds the contaminated material. Examples of reactive mats are found in U.S. Pat. No. 6,284,681 B1 ('681) and published application US 2002/0151241 A1 ('241). The reactive mats described in these two publications include one or more layers of reactive material each surrounded by outer geotextiles that allow contaminated liquid to pass through the reactive mat for sorption or reaction of the contaminate with a reactive material contained between the outer geotextile layers, and in the case of the '241 published application, the mat may be deployed vertically.

One of the major problems encountered with the use of reactive mats for controlling or confining contaminated materials, or in controlling or preventing leaching of contaminants from sediments and preventing the contaminants from entering ground water supplies, and particularly from ground water traversing upwardly through a lake or ocean soil interface into the lake or ocean, is in the ability to provide a transportable, integral mat having a sufficient volume or thickness of reactive material so that the mat provides very long term protection without the necessity of periodic replacement. The reactive mats described in the '681 patent and in the '241 publication provide alternating layers of geotextile/reactive material/geotextile/reactive material since a sufficient thickness of reactive material cannot be provided in a single reactive material core layer without that reactive material being lost during transportation or installation. The mat disclosed in U.S. Pat. No. 7,128,498 does not have adjacent layers interconnected but relies upon a rock covering layer to maintain the mat in position. The mat disclosed in the '498 patent has separate layers that are not structurally interconnected and may easily separate due to the powerful hydraulic force experienced with lake and river ground water supplies. Also, deployment of separate geotextiles and reactive materials through a water column is difficult.

This assignee's U.S. Pat. Nos. 5,237,945 ('945) and 5,389,166 ('166) describe the manufacture of a water barrier formed from a clay-fiber mat that may include a powdered or granular bentonite clay, a powdered or granular liquid-interacting material, e.g., a contaminant-reactant, or providing the contaminant-reactant as a separate layer in the water barrier product. The water barrier mat formed in accordance with the '945 and '166 patents is manufactured by laying down geosynthetic fibers and the water swellable clay, with or without the contaminant-reactant material, simultaneously. In this manner, a geosynthetic composite material can be manufactured wherein the geosynthetic fibers are surrounded by the water-swellable clay, with or without the contaminant-reactant material, in initially forming a relatively thick geotextile that essentially prevents water flow-through. Such a mat must be subsequently consolidated and the fibers must be substantially densified after the initial formation of the mixture of powdered or granular material and fibers in an attempt to secure the fibers in position surrounding the powdered or granular material. Densification of the fibers is achieved after the addition of powdered or granular material since the fibers must be sufficiently spaced to allow for receiving the powdered or granular material.

The following problems may be encountered with filled mats manufactured by simultaneously mixing individual fibers together with powdered or granular materials in accordance with this assignee's U.S. Pat. Nos. 5,237,945 and 5,389,166:

(1) Because interior fibers within the geotextile are not secured to adjacent fibers, particularly in thick mats, there would be lateral movement of powdered or granular material within the mat, particularly at the center of the mat thickness;

(2) It has been found that any reactive materials that have a relatively high hardness, e.g., zero valent iron, will prevent needlepunching as a means to consolidate the mats described in the '945 and '166 patents, since the hard materials will cause needle breakage and frequent replacement of worn needles;

(3) It has been found that needlepunching as a means to consolidate the '945 and 166 mats is limited to relatively thin mats, e.g., less than 1 inch or 2.54 cm (25.4 mm), since fibers are too short to traverse the thickness of thicker mats, after receiving the reactive material, for effective connection; and (4) Because of the shifting of fibers and powdered or granular material during manufacture of the '945 and '166 mats, the powdered or granular material will not be placed within the mat in a consistent quantity (weight per unit volume) and, therefore, will not provide consistent contaminant reaction, contaminant sorption, or contaminant neutralization per unit area.

Another issue with the '945 and '166 mats is that when water swellable sodium bentonite clay is utilized, with or without the reactive material, when the sodium bentonite clay swells, the resulting swell pressure restricts the gaseous and aqueous flow through the mat. Gases and ground water flow may flow around the barrier and escape without treating the contaminant(s).

SUMMARY

In brief, described herein are reactive geocomposite mats, and their method of manufacture, for controlling contaminants in soil or water that allow the passage of essentially non-contaminated water therethrough. The geocomposite mat includes a pre-formed woven or non-woven geotextile, having a thickness of about 6 mm to about 200 mm, preferably about 10 mm to about 100 mm, and having a porosity sufficient (after being secured to a woven or non-woven outer geotextile or base sheet) to receive a powdered or granular contaminant-reactive material, contaminant-sorptive material, or a contaminant-neutralizing material (hereinafter collectively referred to as "contaminant-reactant material" or "contaminant-reactive material") throughout its thickness, or in any portion of the thickness, across its entire major surface(s). The powdered or granular contaminant-reactive material is disposed within the pores of the previously formed, high loft geotextile mat, after needlepunching the high loft geotextile to an outer geotextile sheet material (woven or non-woven), to surround the fibers, e.g., by vacuum suction or by vibrating the high loft mat while in contact with the contaminant-reactive material to allow the powdered or granular contaminant-reactive material to flow, by gravity and/or vibrational forces, into the pores of the previously formed and needlepunched geotextile. Liquid-permeable outer geotextile sheets are adhered to the upper and lower major surfaces of the filled or partially filled high loft geotextile to substantially reduce the thickness and thereby increase the density of the high loft geotextile fibers, and substantially increase the density of reactive material in gm/cm of high loft geotextile thickness (between upper and lower outer geotextile sheets), and to prevent the powdered or granular material from escaping from the geotextile during transportation and installation. Densification, by reduction in fiber thickness, after receiving the powdered or granular material, aids in retaining the powdered or granular material within the finished mat. To achieve the full advantage of the articles and methods disclosed herein, this further densification is accomplished by heat sealing a cover sheet to heat softened, upper mat fibers during compression of the cover sheet onto the heat-softened fibers. Optionally, the edges of the filled geotextile can be sealed, such as by providing the upper and lower cover sheets slightly larger than the dimensions of the geotextile and gluing the extra cover sheet material to the edges of the filled geotextile, or by heat sealing cover sheet material to the edges. Other edge sealing options include sewing, needlepunching, and ultrasonic welding of the cover sheets together or by applying a separate, edge-covering material that can be glued, heat sealed or ultrasonically welded to the cover sheets. Edge sealing materials may be liquid-impermeable or liquid-permeable.

Suitable powdered or granular contaminant-reactive materials include organophilic clay, activated carbon, coke breeze, zero-valent iron, magnetite, apatite, zeolite, peat moss, polymeric ion exchange resins, polymeric adsorbents and mixtures thereof. If the contaminant-reactive material is lighter than water, such as activated coke breeze or activated carbon, where the reactive mat is intended for sub-aqueous disposition, the geotextile fibers will be a material that his heavier than water, such as a polyester or a heavier material, such as sand, is mixed with the activated coke breeze and/or activated carbon to increase density. Any geosynthetic fibers may be used where the reactive material is heavier than water, such as polyolefins, e.g., polypropylene, polyethylene and copolymers thereof; rayon; polyesters; nylon; acrylic polymers and copolymers; polyamides; polyamide copolymers; polyurethanes, and the like.

The method of manufacture permits the manufacture of a geocomposite article that includes a contaminant-reactant material that is structurally secure, without lateral movement, and contains contaminant-reactant material uniformly disposed throughout the thickness, or throughout a desired upper and/or lower and/or central portion of the thickness of the geocomposite. The geocomposite can be manufactured to provide either a flexible or a rigid geocomposite material, and permits the manufacture of various modified geocomposites; geocomposite articles that include a contaminant-reactant material, such as a zeolite or an organophilic clay (with or without a water-absorbent material) for treatment of contaminants in water, in an organic liquid, or in a mixture of water and an organic liquid; a minimum of leakage of powdered or granular materials held by the pre-formed mat; the application of layer(s) of liquid-permeable films or sheets of material over both major surfaces of the article to confine the granular or powdered material in place within the pre-formed geotextile; the application of solid or liquid adhesive materials or compositions to one or both major surfaces and/or to any of the edges of the geocomposite article for complete retention of essentially all powdered and/or granular materials; the capability of inserting one or more rigidifying materials into, or onto, the geocomposite article during manufacture, such as a sheet of perforated fiberglass; rope; cardboard; relatively rigid, liquid-permeable corrugated materials, e.g., corrugated cardboard, and the like at some point at or between the top and bottom major surfaces of the geocomposite article to provide various degrees of flexibility or rigidity; the capability of manufacturing the geocomposite articles by securing one outer geotextile sheet (preferably a lower geotextile sheet during manufacture) by needlepunching while the high loft material is not very dense (thereby minimizing needle breakage) and prior to adding the reactive material, and then attaching the remaining (preferably upper) geotextile sheet to the high loft interior fibers, preferably by heat sealing, after the high loft fibers have been filled with the contaminant reactant material; and providing various sizes, shapes and weights of pre-formed, high loft geotextiles to achieve the benefits of each.

The contaminant-reactant material can be withheld from an upper or lower major surface of the high loft geotextile, if desired, to provide a space or area for the addition of other powdered or granular materials, such as an organophilic clay, a zeolite, an activated carbon or other contaminant-treating material or for heat bonding an upper surface of the high loft fibers to an upper geotextile sheet. For example, the contaminant-reactant material can be omitted throughout a predetermined thickness at the top major surface or the bottom major surface. Alternatively, a powdered or granular water-swellable clay material can be applied in a relatively high concentration at or near the cut ends or edges of the geocomposite article adjacent to one or both major surfaces to permit the water-swellable clay to extrude through the water-permeable cover layer to a planar edge surface immediately above and/or below one or both exterior major surfaces, thereby creating a sealing layer of contaminant-reactant material capable of sealing at overlaps and seams between adjacent or overlapping geocomposite articles.

Accordingly, one aspect of the geocomposite articles described herein is to provide a new and improved article of manufacture and method of making the article by incorporating a powdered or granular contaminant-reactant material into a high loft mat of geotextile fibers after interconnecting the geotextile fibers to a cover sheet or layer.

A further aspect of the geocomposite articles described herein is to provide a new and improved article of manufacture including a powdered or granular contaminant-reactant or contaminant-interacting material, wherein the material is selected from the group consisting of an organophilic clay, a zeolite, a contaminant-absorbent, a contaminant-adsorbent, an ion-exchange material, a contaminant-reactant, a contaminant-neutralizing material, and mixtures thereof as separately applied or intermixed material. The powdered or granular materials may be applied as an admixture, or applied sequentially within a pre-formed, high loft textile mat after the high loft mat has been secured to a geotextile cover layer, and the high loft mat has an apparent opening size of about 0.2 to about 6 mm, preferably about 0.84 mm to about 0.21 mm, to receive the powdered or granular material in an amount of at least about 10 lb/ft$^3$ up to about 150 lb/ft$^3$, preferably about 30 lb/ft$^3$ to about 100 lb/ft$^3$, throughout the thickness, or throughout any upper or lower portion of the thickness of the pre-formed, high loft fibers resulting in an article that has a water permeability of at least $1\times10^{-6}$ cm/sec, preferably in the range of $10^{-4}$ to $10^2$ cm/sec. Preferably, the powdered and/or granular material will occupy about 50% to about 99.9% by volume of the pre-formed geotextile mat, more preferably about 80% to about 99.9% of the pre-formed mat.

In terms of ft$^2$ of article surface area, some target loadings for various reactive materials (which can vary about 50% up or down) are as follows:

|  | REACTANT LOADING |
| --- | --- |
| Organoclay | 0.82 lb/ft$^2$ |
| 100% Carbon | 0.53 lb/ft$^2$ |
| 100% Sand | 0.92 lb/ft$^2$ |
| 60% Carbon/40% Sand | 0.67 lb/ft$^2$ |
| 90% Carbon/10% Sand | 0.56 lb/ft$^2$ |

The above and other aspects and advantages of the geocomposite articles and their method of manufacture will become apparent from the following detailed description of the preferred embodiments taken in conjunction with the drawings.

DETAILED DESCRIPTION OF THE PREFERRED EMBODIMENTS

Figure 1:
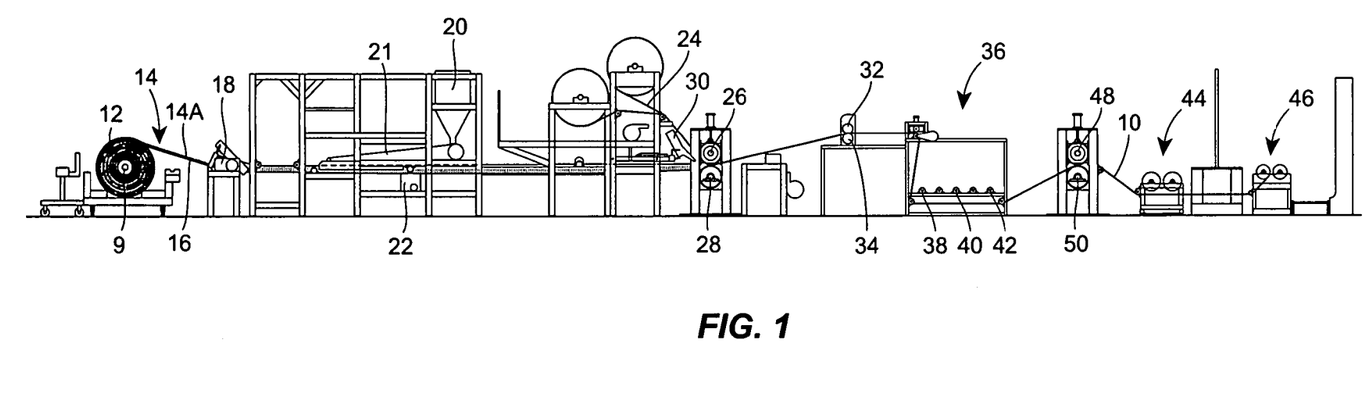
FIGS. 1, 3 and 4 are partially broken-away, schematic views of alternate methods of manufacture and apparatus used to make the geocomposite articles described herein.

Turning now to FIG. 1, there is shown a schematic diagram for a preferred embodiment of manufacturing the geocomposite articles 10 described herein, including many optional features any one or more of which can be included in the manufacturing process to provide various characteristics and properties to the geocomposite articles.

Figure 2:
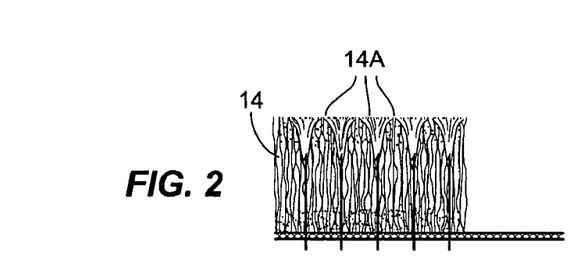
FIGS. 2 and 2A are enlarged, partially broken-away side views of a preferred embodiment of the reactive geocomposite article having a lower woven geotextile sheet attached to the high loft fibrous mat by needlepunching and an upper, non-woven geotextile sheet adhered to the high loft fibrous mat by heat sealing.
Figures 2A, 3:
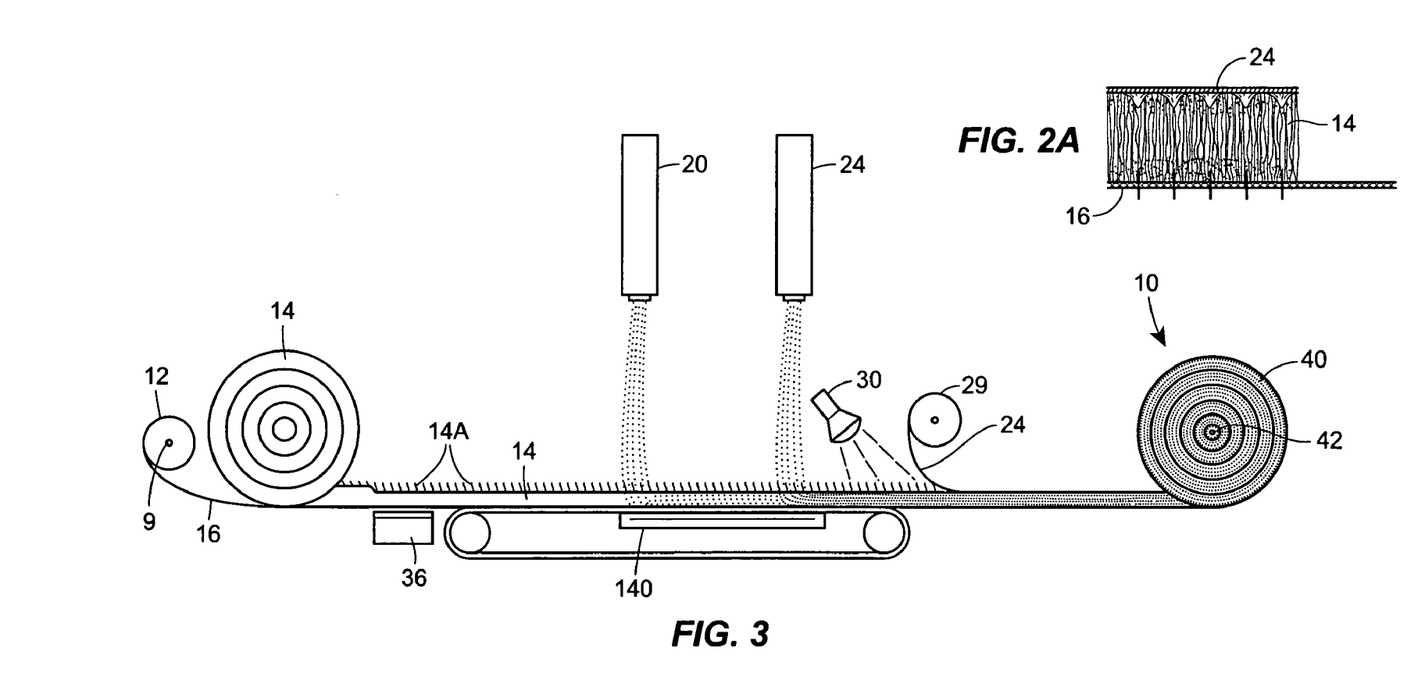

As shown in FIGS. 1 and 3, the preferred geocomposite article 10 is manufactured to include a layer of woven or non-woven liquid-permeable outer geotextile sheet material layers on both major exterior surfaces; various optional reinforcing material can be included within the interior and/or exterior of the article to provide structural reinforcement or to provide various degrees of article rigidity; portions of the high loft geotextile, preferably made from thermoplastic fibers, e.g., a polypropylene, having inter-tangled, non-woven fibers that are at least 5 cm. long, wherein the high loft geotextile remains very porous to allow for flow-through of contaminated water from below after being needlepunched to the lower outer geotextile sheet; and after the subsequent addition of the powdered or granular materials, such as a contaminant (organic) reactant absorbent or adsorbent; and, optionally a water-absorbent material, such as sodium bentonite clay and/or other sodium smectite clay, can be included (e.g., at seams) with the contaminant-reactant material(s) being deposited onto the pre-formed, high loft geotextile. Any of these features can be used alone or together with any of the other features, as best shown in FIGS. 1 and 3, to provide very unique geocomposite articles having any number of different properties and the capability of containing the spread of contaminants.

As shown in FIGS. 1 and 3, there are illustrated methods and apparatus, including a number of optional features each of which can be used alone or in combination with any of the other features, for manufacturing a product having single or plurality of different granular or powdered contaminant-reactant materials, and with or without various reinforcing materials and/or coating materials added to one or both exterior surfaces of the article being manufactured to provide various characteristics or properties to the finished geocomposite article 10, as will be described in more detail hereinafter.

In accordance with a preferred embodiment, as shown in FIG. 1, high loft fibers 14 are needlepunched to a bottom cover layer at an off-site needlepunching facility and obtained from the needlepunching facility as a roll of material 12 that is subsequently loaded onto mandrel 9. At the needlepunching facility, high loft fibers 14 are needlepunched to a woven or non-woven, lower water pervious cover sheet 16. To achieve the full advantage of the articles and methods of manufacture described herein, the high loft fibers 14 needlepunched to the lower cover sheet 16 should be in a concentration or mass of about 300 to about 450 grams of loose fiber per square meter of cover sheet 16 surface area when the fibers 14 are needlepunched to the cover sheet 16. If the mass of the fibers 14 needlepunched to the lower cover sheet 16 is less than about 300 g/m$^2$, the fibers 14 may not provide sufficient void spaces to hold a sufficient quantity of powdered or granular reactive material. If the mass of fibers 14 is greater than about 450 g/m$^2$, needlepunching may not securely attach the high loft fibers 14 to the cover sheet 16 and the fibers 14 may peel away from the cover sheet 16.

In the preferred embodiment of the needlepunching operation (not shown in FIG. 1) required to provide the roll of composite (high loft and cover sheet) material 12 with both sufficient open pore volume or apparent opening size and sufficient strength, a needle density should be provided that is sufficient to provide at least 0.5 lb/in, preferably at least 1.0 lb/in, in peel value when tested in accordance with ASTM test Designation: D-4632 (Re-approved 2003), the standard Test Method of Grab Breaking Load and Elongation of Geotextiles, modified for the needlepunched material 12, as follows:

The test for the composite material 12 utilizes the same 4"×8" sample size as in ASTM D-4632. Instead of test mounting a geotextile in two grips, the needlepunched high-loft composite 12 is tested by separating the high-loft fibers 14 from the woven geotextile 16 at the top and bottom. The high-loft fibers 14 are secured in one grip and the geotextile (preferably woven, 16) in the other grip. The peak value of 5 specimens are averaged. The target value is preferably 1 lb/in peel on the interface between the woven cover sheet 16 and the high loft non-woven fibers 14.

As shown in FIG. 1, the composite material is unwound such that the needlepunched, high loft fibers 14 contact textured roller 18 to extend the fibers 14 outwardly from the lower cover sheet 16 that the fibers 14 are needlepunched into. The outward extension of fibers 14, or fluffing of the fibers 14, returns the fibers 14 to their high loft and porous condition after needlepunching and before being compacted into the roll of composite material 12.

After the needlepunched fibers 14 are fluffed by textured roller 18, the composite material comprising the lower cover sheet 16 and fluffed needlepunched fibers 14 is conveyed under reactive material hopper 20 and feed conveyor 21 and over vibrator 22, where the reactive material is deposited from feed conveyor 21 and vibrated into the needlepunched, porous fibers 14.

In the preferred embodiment, a water-pervious cover sheet 24 then is disposed over the composite material comprising the lower, water-pervious cover sheet 16, and needlepunched fibers 14 containing the reactive material. To achieve the full advantage of the articles and methods of manufacturing described herein, the cover sheet 24 is heat-melt adhered to the upper surface of the upwardly extending fibers 14 to enclose the fiber-contained reactive material between the water-pervious lower cover sheet 16 and water-pervious upper cover sheet 24. As shown in FIG. 1, a heat source, e.g., a heat gun 30, is positioned to supply heat at a pair of nip rollers 26,28 to heat a lower surface of the cover sheet 24 at the same time as heating the upwardly extending, randomly oriented fibers 14. Enough heat is supplied at the meeting point of cover sheet 24, preferably a polyolefin, such as polyethylene or polypropylene, and fibers 14 to heat-soften or melt either the undersurface of cover layer 24 or upwardly extending fibers 14, or both, so that when the softened geotextile sheet 14 and/or geotextile fibers 14 are compressed between nip rollers 26 and 28 and subsequently cooled, the cover sheet 24 is heat-sealed to the fibers 14.

In accordance with a preferred embodiment of the articles and methods described herein, the heating device, e.g., heat gun(s) 30, is positioned across the entire width of the geocomposite article 10 being manufactured. After heat sealing, the article 10 travels through guide rolls 32,34 on route to an accumulator 36 containing alternate, upwardly reciprocating rollers 38,40 and 42 that move upwardly to accumulate product 10 when a completed roll of product is removed from product station 44 or 46. In this manner, the manufacturing process remains continuously producing product during removal of a roll and during positioned of product onto a different mandrel at product station 44 or 46. Guide rollers 48 and 50 guide the product to product station 44 or 46.

The liquid-permeable sheet material layers 14 and 24, are used to prevent loss of the powdered or granular material during transportation and installation. To achieve the full advantage of the articles and methods described herein, the high loft fibers 14 are needlepunched to geotextile sheet 16 (preferably woven) before being loaded onto mandrel 9 resulting in a needlepunched mat having a density of about 0.90 to about 2.0 lb/ft$^3$ for the high loft geotextile fibers 14, preferably about 0.94 to about 1.6 lb/ft$^3$ at a thickness of about 0.5 to 1.1 inches. The preferred method of manufacture is to first adhere the lower liquid permeable geotextile sheet material layer 16 to the high loft fibers 14 by needlepunching, followed by filling or partially filling the high loft geotextile fibers 14 with the powdered or granular material, followed by heat sealing the upper, liquid-permeable outer geotextile sheet material 24 to heat-softened, upwardly extending fibers 14A (FIG. 3) of the high loft geotextile fibers 14 containing the powdered or granular material. In a preferred embodiment, heat guns 30 heat the upwardly extending fibers 14A of the high loft geotextile 14 and the undersurface of the upper geotextile cover sheet 24 to their softening (melting) point and the cover sheet is compressed against the heat softened, upwardly extending fibers 14A to heat seal them to the cover sheet 24, without forming a continuous, water-impermeable film on the under surface of the upper cover layer 24. In one embodiment, the powdered or granular material penetrates the high loft fiber 14 by vibrating the composite article with vibrator 22. Alternatively, vacuum 140 (FIG. 3) can be applied under the geotextile in place of vibrator 22.

As shown in the schematic illustration of FIG. 3, including a needlepunching station 36 and vacuum apparatus 140, additional contaminant-reactive material in granular or powdered form can be applied to the filled geotextile fibers 14 from an additional feeding hopper 24 to provide one or more surface concentrations of contaminant-reactive material or to apply a different powdered or granular contaminant-reactive, prior to applying the water-permeable cover layer 24. The upper major surface 14A of the high loft geotextile fibers 14 are then heat sealed to the upper, preferably non-woven, cover layer 24, from roll 29, as described. In accordance with an important feature of the articles and methods described herein, the upper cover layer 24 is heat-sealed to the upwardly extending fibers 14A of the geotextile fibers 14, creating a discontinuous bond so that the articles 10 remain water-permeable.

In a separate operation, needlepunching, in the preferred embodiment, is provided to secure the high loft fibers 14 to the lower, outer geotextile sheet 16 (preferably woven) to interlock the high loft geotextile fibers 14 to the lower cover sheet 16 to provide sufficient strength, and sufficient reactive material, to the final article 10. The finished article 10 can be collected in a roll form 40, taken up on a suitable mandrel 42, or can be festooned onto pallets (not shown) or the like.

Figure 4:
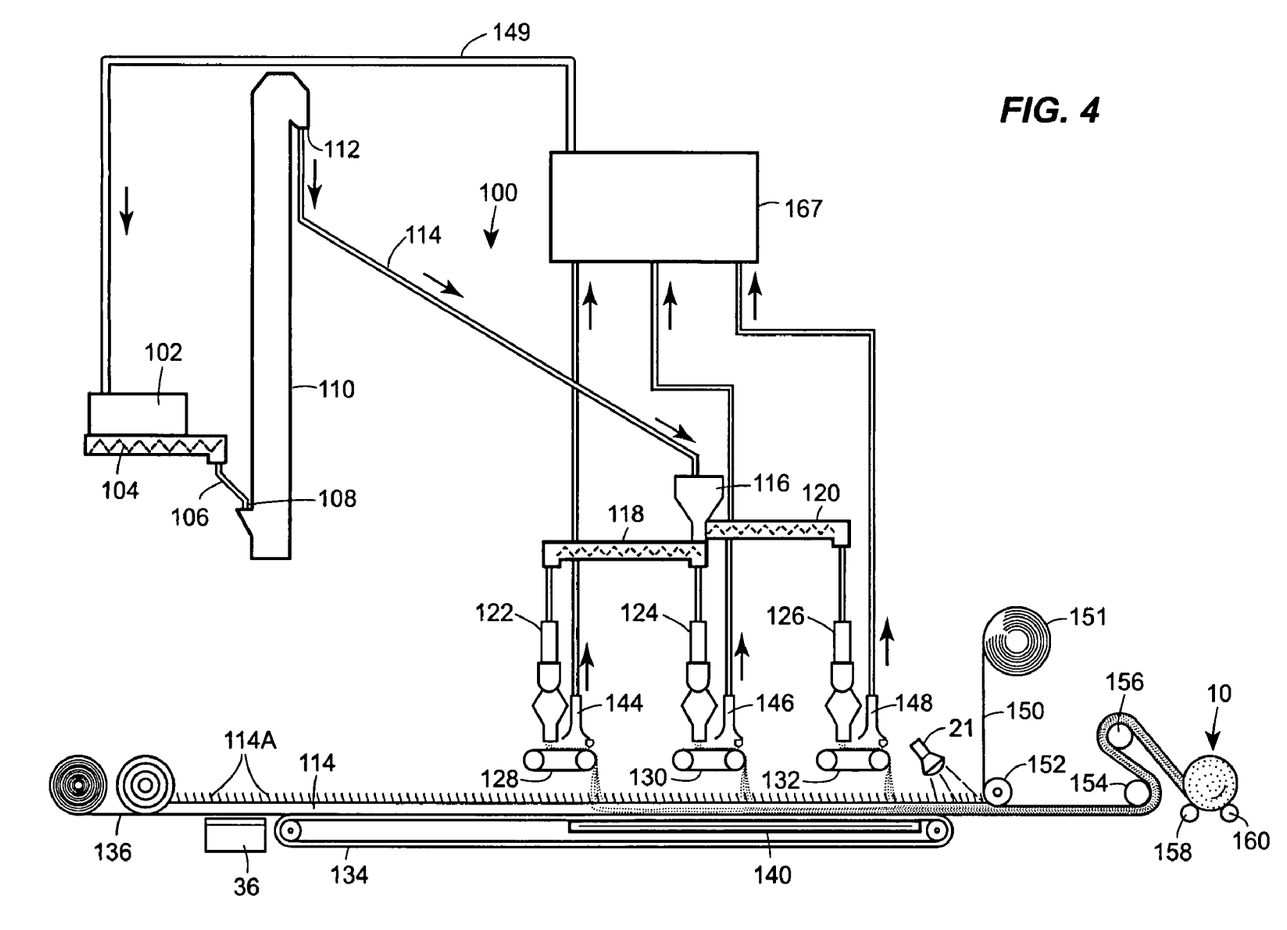

As shown in the schematic of FIG. 4, there is shown one method of loading high loft geotextile fibers 114 with powdered or granular contaminant-reactant material in a dry state. The dry material feeding apparatus, generally designated by reference numeral 100 is useful for depositing one or more powdered or granular contaminant-reactant materials, such as an organophillic clay, from a receiving hopper 102. An auger 104 is disposed at a lower end of the receiving hopper 102, and in fluid communication therewith, to force the contaminant-reactant material through conduit 106 to an inlet 108 of elevator 110. The contaminant-reactant is discharged from the elevator 110 at elevator outlet opening 112, through conduit 114 into a receiving hopper 116. A pair of augers 118 and 120 in fluid communication with a lower portion of hopper 116 force the contaminant-reactant into one, two or three feeding mechanisms, generally designated by reference numerals 122, 124 and 126, for feeding the contaminant-reactant material in a controlled manner to one, two or three continuous feed conveyor belts 128, 130 and 132 successively aligned above an elongated product conveyor belt 134. The contaminant-reactant generally is applied over the high loft, geotextile mat 114 to substantially fill the void spaces between fibers in the high loft, geotextile mat 114 in an amount of about ¼ to 30 pounds of powdered or granular material per square foot of finished article major surface area, preferably about ¼ to about 5 pounds of powdered or granular material per square foot of article major surface area.

In accordance with one embodiment shown in FIG. 4, the upper surface 114A of the high loft geotextile fibers 114, after filling, is then heated by heat gun 21 (extending across the entire upper surface of geotextile fibers 14) to the fiber softening point as the upper (cover) sheet material (layer 150) is pressed onto the softened, high loft fibers by compression roller 152 to discontinuously adhere the outer geotextile sheet material layer 150 to an upper surface of the high loft geotextile 114 after the geotextile 114 has been filled from one or more of the feeding mechanisms 122, 124 and/or 126, deposited onto the geotextile 115 from one, two or all three of the feed conveyor belts 128, 130 and 132. Any one, two or all three of the feed conveyor belts 128, 130 and 132 can be used to incorporate the same or different powdered or granular contaminant-reactant materials throughout a portion of, or the entire thickness of the geotextile 114. Vibration apparatus 140 is connected to the product conveyor belt directly below the feed conveyor belts 128, 130, and 132 to vibrate the powdered or granular contaminant-reactant materials into the geotextile 114.

The individual powdered or granular materials are deposited across the entire width of the geotextile fibers 114, as the particles drop from the feeders 122, 124 and/or 126. In this manner, the entire thickness or any portion of the thickness of the high loft fibrous mat 114 is filled with the contaminant-reactant material. Dust collection suction devices 144, 146 and 148 may be disposed near each continuous contaminant-reactant feed conveyor belt 128, 130 and 132 to clear the air of fine particles emanating from feeding mechanisms 122, 124 and 126 and return the particles back to a dust collector 167 for disposal and/or back to the receiving hopper 102, via conduit 149. The upper (cover) water-permeable sheet material 150, from roll 151, is disposed on a downstream side of the powdered or granular material feeding mechanisms 122, 124, and 126 and above the product conveyor belt 134. The second flexible, water-permeable sheet material 150 preferably is a non-woven and is fed by power driven roller 152, power rollers 154 and 156 and wind up rollers 158 and 160 to dispose flexible, water-permeable sheet material 150 on top of the contaminant-reactant-filled article to dispose the filled geotextile material 114 between lower, water-permeable flexible sheet material 136 and upper, water-permeable flexible sheet material 150.

The powdered or granular contaminant-reactant material utilized to fill the void spaces between the fibers of the high loft, geotextile 114 has a particle size in the range of about 1 to about 400 mesh, preferably about 10 to about 200 mesh.

Figure 7:
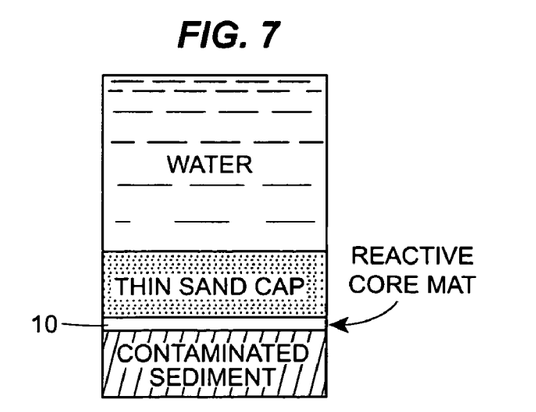
FIG. 7 is a schematic view showing the geocomposite article (reactive core mat) disposed above a contaminated sediment, and weighted in place with a sand cap layer.

Some of the most prevalent contaminants found in waste waters contained in ponds, lagoons, areas of subterranean structure and other water-releasing or organic (hydrocarbon) spill areas, particularly where these areas include industrial waste waters, are heavy metal ions and water-insoluble or partially water-insoluble organic materials. It is well known in the prior art that natural and synthetic zeolites and ion exchange resins are capable of removing a substantial portion of the heavy metal ions from a waste water solution and that organophilic clays are capable of removing water-insoluble organic materials from solution. However, the prior art suggests that removal of these materials from waste water streams should be done on-stream, treating the entirety of the waste water stream in order to remove these materials, requiring frequent replacement of treating materials because of the heavy volumes of waste water stream that passes through the zeolites or passes through the organophilic clays in order to clarify these waste water streams. By including an organophilic clay, or applying a mixture of water-swellable clay (not required) with a zeolite or organophilic clay, to fill the voids between fibers of the high loft geotextile 14 (FIG. 1) or 114 (FIG. 4), the zeolite and/or organophilic clay will form a water-treatment material wherein the zeolite and/or organophilic clay will remove the contaminants, e.g., hydrocarbon contaminants, and allow the clean water to pass through the article 10 as shown in FIG. 7.

Figure 5:
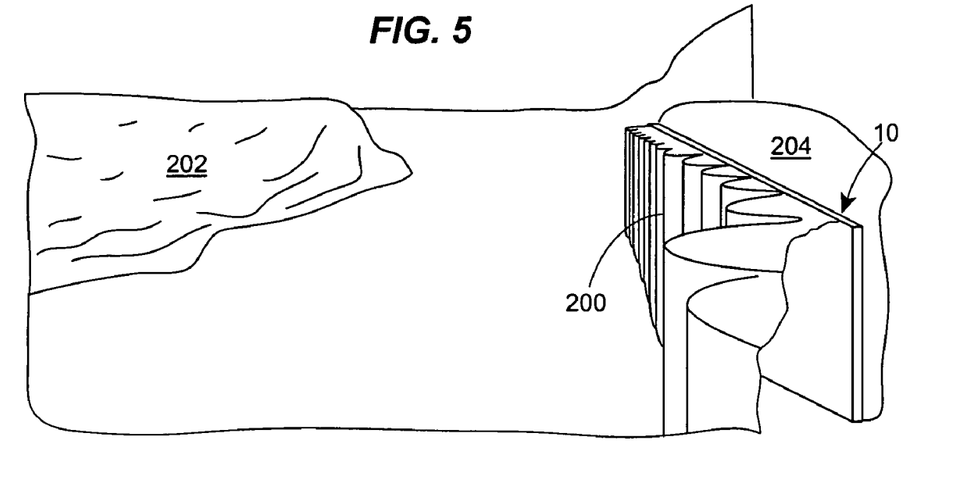
FIG. 5 is a perspective view showing the geocomposite article described herein oriented vertically, adjacent to a sea/soil interface, for sorbing contaminants, e.g., hydrocarbons from a petroleum spill, that leach through soil and travel through the sea/soil interface, into the sea, to prevent the contaminants from traversing the sea/soil interface.
Figure 6:
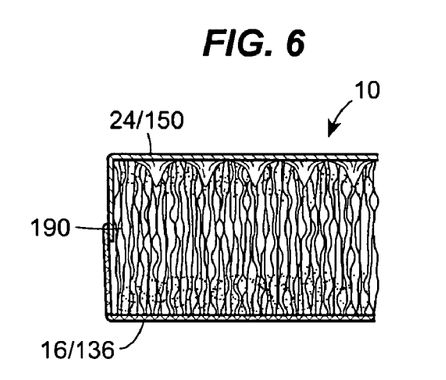
FIG. 6 is a partially broken-away side view of an edge of the geocomposite article having excess material from upper and lower outer geotextile sheets adhered together, either adhesively, by heat-sealing, or by ultrasonic welding, to seal the edges of the article.

As shown in FIG. 5, the articles 10 described herein are particularly effective for vertical disposition adjacent to a sea/soil interface 200 for protecting a lake or ocean 202 against hydrocarbon contaminants that otherwise leach through soil 204 and penetrate the sea/soil interface 200.

In accordance with another important embodiment of the articles described herein, the contaminant-reactant material, comprising any contaminant-adsorbent, -absorbent, -reactant, or -neutralizing material can be supplied as a separate layer adjacent to another powdered or granular contaminant-reactant material so that the amount of material treated for the removal of a given contaminant is only that material which penetrates the adjacent layer of powdered or granular material.

In accordance with another important feature of the articles and methods described herein, the contaminant-reactant materials mixed or supplied as separate layers can be any material capable of adsorbing, absorbing, neutralizing, or reacting with the contaminant for insolubilization and/or separation of the contaminant from the liquid stream flowing through the reactive material. Examples of materials capable of removing or neutralizing contaminants include absorbent fibers, such as microcrystalline cellulose; attapulgite clay; apatite; zinc rincinoleate absorbed on an absorbent fiber or other absorbent material; amorphous silica powder; synthetic calcium silicate; polyolefin pulp; sodium alumino-silicate (type A sodium zeolite); maltodextran; sodium silica aluminates (note that all the above are absorbents). Other materials, such as adsorbents include microcrystalline cellulose; silica hydrogel based compositions; attapulgites; synthetic sodium magnesium silicates; synthetic calcium silicates; silicon dioxide; acid activated clays; type A sodium zeolites; and the like provided as a separate layer or mixed with the absorbents and/or adsorbents. Other materials can be included such as an algicide, antimicrobial material, bactericide, disinfectant, and/or fungicides such as phenol; zinc undecylenate N.F.; acetyl tyridinium chloride N.F.X.III and the like.

Most preferred as the adsorbent, absorbent and/or reactant and/or neutralizing material are coke breeze, activated carbon, zero-valent iron, magnetite, natural or synthetic zeolites, apatite, and/or an organophilic clay, which is basically a montmorillonite clay that has been reacted with a quaternary organic material to make it hydrophobic and absorbent to organic contaminants.

The high loft geotextile fibers 14 or 114 preferably is a high loft non-woven. Suitable fibers of construction of the geotextile mat 14 or 114 include fibers made from rayon, polypropylene, polyesters, nylon, acrylic polymers and copolymers, ceramic fiber, fiberglass, propylene-ethylene copolymers, polypropylene-polyamide copolymers, a single monofilament, polyethylene, polyurethane, cotton, jute and any other non-biodegradable, or very slowly biodegradable, fibers preferably having both bacteriological and chemical resistance. In some installations, the thickness of the article is not important and such articles can be formed with any desired thickness, e.g., 3 mils to about 4 inches containing about 0.2 to about 30 pounds per square foot of contaminant-reactant material.

The above-described products can be modified in a number of ways to suit various purposes and this adaptability of the products is one of the primary benefits when compared with water barriers of the prior art. For example, the products described herein can be loaded with a heavy material such as sand, or a heavy mineral such as Barite, iron oxide or the like, relatively uniformly, together with a powdered or granular contaminant-reactant so that the overall product has a specific gravity greater than 1.0 thereby enabling the material to submerge easily in water. Accordingly, the product can be applied to the sediment surface at the bottom of a lake, bay, river, waterway, filled lagoon, waste containment area, and the like, without first draining the lagoon or waste containment area. The product containing a heavy mineral can be rolled out over the water or waste containment upper level and allowed to sink to cover the sediment surface at the bottom of the water or liquid waste material, thereby saving substantial time, effort and expense in sealing an area, and the like, without first draining the area.

In another embodiment, the products described herein can have incorporated therein a very light material such as expanded vermiculite or expanded perlite, so that the product has substantial buoyancy in water, liquid waste materials, and the like, to form a cover over a liquid waste containment area, such as a toxic waste lagoon, to prevent external compounds, dust, and dirt from entering the waste containment area. One portion of this cover material can be adapted for removal or rolling back so that additional toxic waste and the like may be added to the covered containment area while maintaining a water-impervious cover to prevent further filling of the waste containment area with rain water.

Drainage structures and other articles used in the water drainage arts can be virtually incorporated into the interior of this product during manufacture, e.g., under the upper and/or lower outer geotextile sheets. Herbicides, bactericidal materials, tracer chemicals, various colorants that indicate contact with a particular chemical or class of chemicals, and the like, also can be incorporated into the articles described herein.

The product is particularly effective in shored wall conditions for application against steel sheet piling; soldier beam and lagging; soldier beam and earth installations; concrete caissons; earthen stabilized wall structures and soil/sea interface wall structures. In addition to the usual geotextile-type fibers, cellulosic fibers can be used as well as hay, straw, coconut fibers and fibers refined from wood chips and the like, particularly for use as an agricultural root zone liner to provide liquid feed for the promotion of plant growth. The products described herein are also useful as gas barriers, particularly Radon gas barriers, to protect structures and containers above or below ground. Many other uses for the products of the present invention should be apparent to those skilled in the art.

The uses for the powdered or granular material-filled or partially-filled products described herein are virtually infinite since the product can be made completely flexible, relatively rigid or rigid and can be applied against very contoured and slopping surfaces, rough or smooth, as well as vertical surfaces, such as foundation walls, dams, along the sides of canals and below grades such as in tank farms, and for irrigation and water conservation techniques. The products are particularly well suited for providing contaminant-removal in shored wall conditions to protect surface areas that are vertical, sloped or horizontal.

What is claimed:

1. A reactive geocomposite article for treating contaminants in soil or water comprising:
    a pre-formed geotextile mat formed by needlepunching non-woven geotextile fibers to a lower water-pervious geotextile cover sheet at a concentration of about 300 to about 450 grams of fibers per square meter of cover sheet surface area prior to adding a powdered or granular reactive material thereto, said mat having a thickness of about 6 mm to about 200 mm, wherein the non-woven fibers have void spaces that provide sufficient porosity to receive a powdered or granular reactive material and the geotextile article remains water-pervious;
    a powdered or granular reactive material uniformly disposed within at least a portion of the void spaces of the pre-formed geotextile mat, secured against lateral movement and surrounding some of the geotextile fibers of said pre-formed geotextile mat;
    a water-pervious upper geotextile cover sheet adhered to the upper surface of the pre-formed geotextile mat containing the powdered or granular reactive material by heat sealing the upper geotextile sheet to heat softened upwardly extending fibers of the pre-formed geotextile mat during compression of the outer geotextile sheet onto the heat-softened fibers of the pre-formed needlepunched geotextile mat to densify and confine the reactive material within the geocomposite article, between the lower and upper geotextile cover sheets.

2. The reactive geocomposite article of claim 1, wherein the powdered or granular reactive material is selected from the group consisting of activated carbon, coke breeze, zero-valent iron, magnetite, apatite, organophilic clay, zeolite, polymeric ion exchange resins, polymeric adsorbing resins and mixtures thereof.

3. The reactive geocomposite article of claim 1, wherein the geotextile fibers are selected from the group consisting of polyolefin, polyester, polyamide, and copolymers of any two or more of the foregoing.

4. The reactive geocomposite article of claim 2, wherein the reactive material is an adsorbent material selected from the group consisting of activated carbon, coke breeze, organophilic clay, and any combination thereof.

5. The reactive geocomposite article of claim 1, wherein the pre-formed geotextile, prior to receiving the powdered or granular reactive material, has an apparent opening size in the range of about 0.2 mm to about 6 mm.

6. The reactive geocomposite article of claim 5, wherein the powdered or granular reactive material has a particle size such that at least 90% of the particles have a size in the range of about 6 mesh to about 325 mesh.

7. The reactive geocomposite article of claim 5, wherein the powdered or granular reactive material comprises about 50% to about 99.9% by volume of the pre-formed geotextile mat.

8. The reactive geocomposite article of claim 1, wherein the geocomposite article has 30 lb/ft$^3$ to 100 lb/ft$^3$ of powdered or granular reactive material contained therein.

9. The reactive geocomposite article of claim 3, wherein the geotextile fibers are selected from the group consisting of polyethylene fibers, polypropylene fibers, polyester fibers and polyamide fibers.

10. The reactive geocomposite article of claim 1, wherein the pre-formed geotextile mat is woven with non-woven fibers.

11. The reactive geocomposite article of claim 10, wherein one of the liquid-permeable geotextile cover sheets is woven and the other cover sheet is non-woven.

* * * * *